United States Patent
Balachandran et al.

(10) Patent No.: US 9,882,974 B2
(45) Date of Patent: Jan. 30, 2018

(54) NETWORK-BASED COLLABORATION FOR SECURE DATA INTERCHANGE FOR IMAGE DATA RECORDS HAVING CONFIDENTIAL COMPONENTS

(71) Applicant: Siemens Aktiengesellschaft, Munich (DE)

(72) Inventors: Bijesh Balachandran, Bangalore (IN); Srividya Tirunellai Rajamani, Bangalore (IN); Vladyslav Ukis, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 14/571,345

(22) Filed: Dec. 16, 2014

(65) Prior Publication Data

US 2015/0237124 A1    Aug. 20, 2015

(30) Foreign Application Priority Data

Feb. 18, 2014    (DE) .................. 10 2014 202 953

(51) Int. Cl.
*H04L 29/06* (2006.01)
*H04L 29/08* (2006.01)

(52) U.S. Cl.
CPC .......... *H04L 67/1014* (2013.01); *H04L 63/20* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,260,021 B1 * | 7/2001 | Wong .................... | G06F 19/321 705/1.1 |
| 6,915,265 B1 * | 7/2005 | Johnson ................ | G06F 19/322 705/2 |
| 7,660,413 B2 | 2/2010 | Partovi et al. | |
| 8,694,646 B1 * | 4/2014 | Kothari ............... | H04L 63/0435 709/227 |
| 2006/0230072 A1 * | 10/2006 | Partovi ................. | G06F 19/322 |
| 2011/0283202 A1 * | 11/2011 | Drews ................... | G06F 9/542 715/752 |

(Continued)

*Primary Examiner* — Philip Chea
*Assistant Examiner* — Hassan Khan
(74) *Attorney, Agent, or Firm* — Harness, Dickey & Pierce, P.L.C.

(57) ABSTRACT

A network-based system (and method) is disclosed for the collaboration of transmission nodes and receiver nodes for secure data interchange for radiological image data records including confidential components. The processing node provides a set of virtual clients, wherein a virtual client is associated with a respective receiver node and is intended to provide the intended pseudonymized image data record. A connection message is sent to the respective receiver nodes. The connection message includes a reference to the address of the virtual client that the receiver node can use to retrieve the pseudonymized image data record if it is situated outside a security domain of the transmission node. Furthermore, the connection message includes a reference to a memory address in the local PHI share memory unit that the receiver node can use to provide the original image data record if the receiver node is situated inside the security domain.

21 Claims, 3 Drawing Sheets

(56) References Cited

U.S. PATENT DOCUMENTS

| | | | |
|---|---|---|---|
| 2013/0208966 A1* | 8/2013 | Zhao | G06F 9/5072 382/131 |
| 2013/0325805 A1* | 12/2013 | Tochilnik | G06F 21/6254 707/638 |
| 2014/0236628 A1* | 8/2014 | Friese | G06F 19/321 705/3 |
| 2014/0379377 A1* | 12/2014 | Konig | G06F 19/322 705/3 |

* cited by examiner

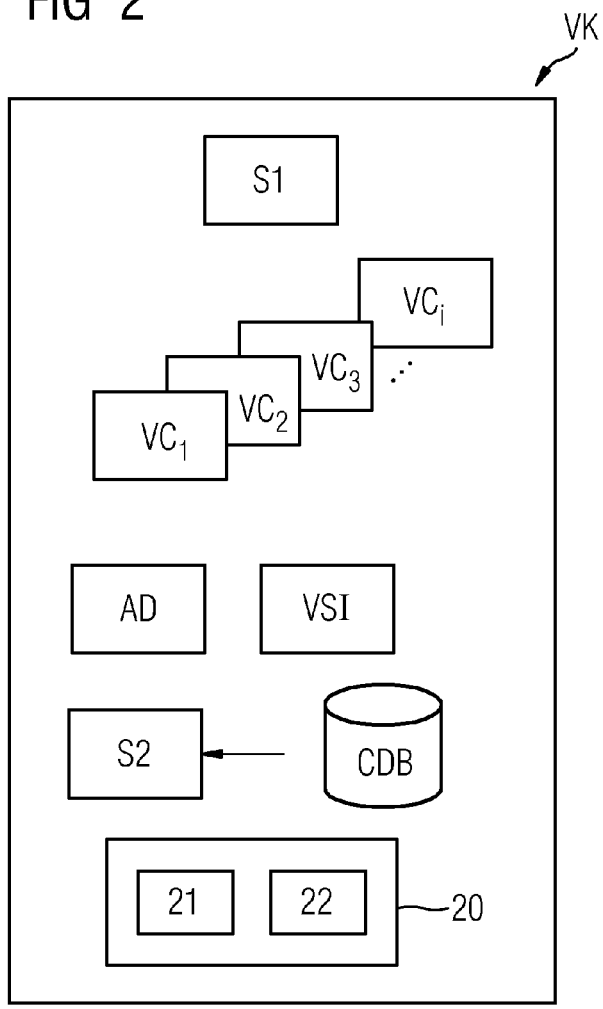
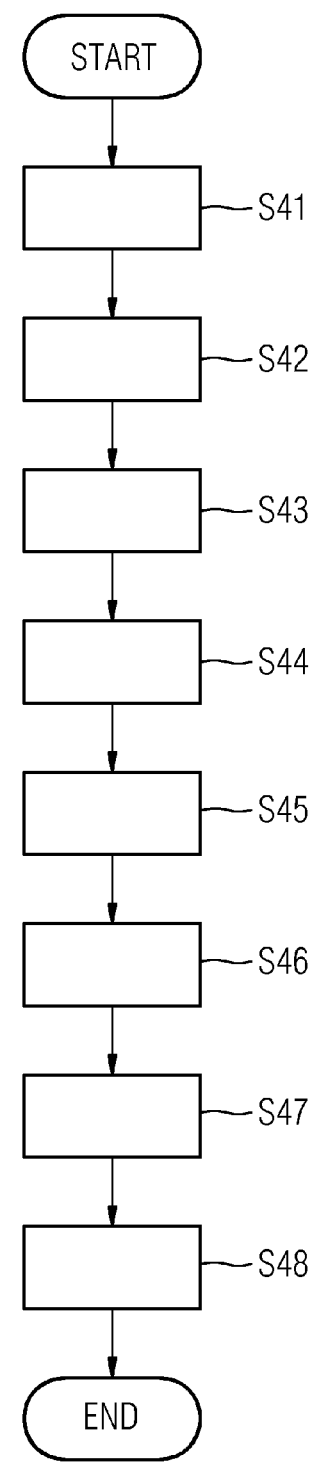
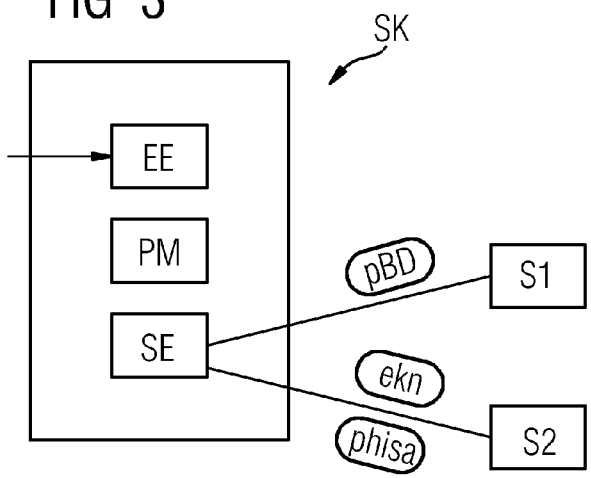

NETWORK-BASED COLLABORATION FOR SECURE DATA INTERCHANGE FOR IMAGE DATA RECORDS HAVING CONFIDENTIAL COMPONENTS

PRIORITY STATEMENT

The present application hereby claims priority under 35 U.S.C. § 119 to German patent application number DE 102014202953.8 filed Feb. 18, 2014, the entire contents of which are hereby incorporated herein by reference.

FIELD

At least one embodiment of the invention concerns the field of network engineering and relates particularly to a network-based system for the collaboration of different network nodes. An important field of application of embodiments of the invention is medical radiology and relates to the secure data interchange for radiological image data records.

BACKGROUND

In modern medical engineering today, many processes and methods, such as the performance of an operation, treatment planning or reporting, are based on acquired medical images. One example of this is medical radiology. By way of example, many operations today are performed with the assistance of images, which means that the surgeon or doctor can also track and correct the intervention with the assistance of images.

For the benefit of the patient and to reduce the applied dose of radiation, it is naturally desirable for as few images as possible to need to be acquired in principle. Conversely, however, this means that images, once acquired, also need to be available for later processes and that the acquired images need to shared with other users, for example for the purposes of a clinical council or a comprehensive diagnosis. Furthermore, the medical images are frequently not acquired in one and the same medical entity (e.g. in a hospital), but rather are required at different locations, which likewise results in the respective image data needing to be interchanged between the processing entities involved.

For efficient cooperation of radiologists, it is indispensible for an efficient system for interchanging image data to be provided. However, it is necessary to ensure that the legal provisions concerning security are observed. These require security-critical or confidential data records not to be distributed beyond particular boundaries.

By way of example, it is necessary to ensure that information identifying the respective patient (such as name, age, date of birth, etc.) does not fall into unauthorized hands. These security-critical data records are frequently also called PHI information (PHI—protected health information). The data interchange therefore needs to take place in compliance with the rules, so that the PHI data records are visible only inside the respective hospital or inside the hospital department, for example.

In the prior art, there are two concepts, in principle, for information systems in order to allow collaboration between radiologists. A first approach is based on transmitting the complete screen interface content to another computer interface of the cooperating radiologist. A second concept is based on transmitting only the basic medical images.

However, the second approach requires the cooperating radiologist to whom the images are meant to be sent to himself have the appropriate software and hardware on his computer in order to be able to actually show the image data records. This means a corresponding level of installation and maintenance complexity. Problems arise particularly when the sending system and the receiving system do not have the same equipment on the computer.

For more extensive applications, it is furthermore necessary for the same tools to be available. In some cases, it is even necessary for the same version of a software application to be installed on both the sending appliance and the receiving appliance in order to be able to ensure error-free transmission. The known methods therefore have considerable disadvantages, since increased infrastructure complexity is incurred on both systems.

In the case of the first-mentioned systems, which thus involve the complete screen content being transmitted, problems also arise because the transmission of the images frequently does not comply with the security standard. By way of example, it may be a simple matter for the complete image data records to be sent to the cooperating radiologist even though the latter is situated outside a security domain (e.g. outside the hospital) of the sending radiologist. When the images are sent, confidential data records are automatically also transmitted beyond the security boundaries, which is not permissible.

SUMMARY

At least one embodiment of the present invention demonstrates a way in which an information infrastructure can be provided in order to send radiological image data records having confidential data components to a multiplicity of cooperating users, who do not necessarily need to be situated inside the security domain of the sending node—but certainly may be—, in accordance with security provisions. Furthermore, at least one embodiment may make it possible to allow cooperation between users who work at different network nodes—for example in the course of a medical diagnosis—, with no particular demands being placed on the infrastructure at the respective receiving network nodes. Thus, cooperation on the basis of the image data is meant to be possible regardless of the respective equipment of the receiving nodes.

Embodiments of the invention are directed to a network-based system, a method for collaboration, a transmission node, a method for operating a transmission node, a processing node and a method for operating a processing node according to the accompanying coordinate patent claims. Advantageous refinements of the invention can be found in the dependent claims.

According to one aspect, at least one embodiment of the invention relates to a network-based system for the collaboration of transmission and receiver nodes for secure data interchange for radiological image data records having confidential components, comprising:

at least one transmission node, including:
 a reception unit that is intended to provide an image data record or to receive one from an imaging facility,
 a pseudonymization module that is intended to pseudonymize the image data record,
 a transmission unit that is intended to send the pseudonymized image data record and a receiver node message and a PHI share address to a processing node, wherein the receiver node message defines receiver nodes for the image data record that are determined by the transmission node and wherein the PHI share address is image data record specific and denotes a memory location in a PHI share memory unit local to the security domain at which the transmission unit stores the respective image data record, a cloud-based processing node, having:
- an image data server that is intended to receive the pseudonymized image data record from the transmission node,
- a plurality of virtual clients, wherein a respective virtual client is associated with a respective receiver node and is intended to provide the pseudonymized image data record intended for the receiver node,
- a collaboration server that is intended to receive the receiver node message for the respective pseudonymized image data record from the transmission node and that is intended to send a connection message to the determined receiver nodes, wherein the connection message comprises a reference to an address for the respective virtual client in which the respective pseudonymized image data record for the receiver node is stored and/or the received PHI share address in the PHI share memory unit local to the security domain,
- at least one receiver node that can be determined by the transmission node for collaboration and on which the pseudonymized image data record is displayed by means of the reference to the virtual client associated with the receiver node if the receiver node is situated outside a security domain of the transmission node and on which the image data record is displayed by means of the address in the PHI share memory unit if the receiver node is situated inside the security domain of the transmission node.

Furthermore, according to one embodiment, the invention relates to a method for the collaboration of transmission and receiver nodes for secure data interchange for radiological image data records having confidential components, comprising the following method steps:
- provision of an image data record on a transmission node,
- application of a pseudonymization function to the image data record in order to produce a pseudonymized image data record,
- determination of receiver nodes for the image data record and production of a receiver node message that defines the determined receiver nodes,
- storage of the image data record locally to the security domain at an image data record specific PHI share address in a PHI share memory unit local to the security domain,
- transmission of the pseudonymized image data record, the receiver node message and the PHI share address associated with the image data record to a cloud-based processing node,
- provision of a set of virtual clients, wherein a respective virtual client is associated with a respective receiver node and is intended to provide the virtual image data record that is intended for it,
- sending of a respective connection message from the cloud-based processing node to the respective receiver node, wherein the connection message comprises a reference to an address for the respective virtual client in which the respective pseudonymized image data record for the receiver node is stored and/or the received PHI share address in the PHI share memory unit local to the security domain,
- reception of the connection message on the at least one receiver node and activation of the reference contained therein for the provision of a pseudonymized image data record by means of the virtual client, if the receiver node is situated outside a security domain of the transmission node or for the provision of the image data record by means of the PHI share address in the PHI share memory unit local to the security domain if the receiver node is situated inside the security domain of the transmission node.

At least one embodiment is directed to a cloud-based processing node for the collaboration of transmission and receiver nodes for secure data interchange for radiological image data records having confidential components, including:
- an image data server that is intended to receive the pseudonymized image data record from a transmission node,
- a plurality of virtual clients, wherein a respective virtual client is associated with a respective receiver node and is designed to provide the pseudonymized image data record intended for the respective receiver node,
- a collaboration server that is intended to receive a receiver node message and a PHI share address for the respective pseudonymized image data record from the transmission node and that is intended to send a connection message to the determined receiver nodes, wherein the connection message comprises a reference to an address for the respective virtual client in which the respective pseudonymized image data record for the receiver node is stored and/or the received PHI share address in a PHI share memory unit local to the security domain.

Furthermore, at least one embodiment is directed to a method for operating a cloud-based processing node for the collaboration of transmission and receiver nodes for secure data interchange for radiological image data records having confidential components, comprising:
- reception of a pseudonymized image data record, a receiver node message and the PHI share address associated with the image data record,
- provision of a set of virtual clients, wherein a respective virtual client is associated with a respective receiver node and is intended to virtually provide the pseudonymized image data record that is intended for it,
- sending of a respective connection message to the respective receiver node, wherein the connection message comprises a reference to an address for the respective virtual client in which the respective pseudonymized image data record for the receiver node is stored and/or the received PHI share address.

At least one embodiment is directed to a transmission node for collaboration with the receiver nodes for secure data interchange for radiological image data records having confidential components, comprising:
- a reception unit that is intended to provide an image data record or to receive one from an imaging facility,
- a pseudonymization module that is intended to pseudonymize the image data record,
- a receiver node determination unit that is intended to determine receiver nodes for the image data record and to generate a receiver node message therefrom,
- a transmission unit that is intended to send the pseudonymized image data record and an image data record specific PHI share address and the receiver node message to a processing node and wherein the transmission unit is intended to store the respective image data record at the PHI share address in a PHI share memory unit local to the security domain.

In addition, at least one embodiment of the invention may reside in a method for operating a transmission node for the collaboration of transmission and receiver nodes for secure data interchange for radiological image data records having confidential components, comprising:

provision of an image data record on a transmission node, application of a pseudonymization function to the image data record in order to produce a pseudonymized image data record, determination of receiver nodes for the image data record and production of a receiver node message that defines the determined receiver nodes, storage of the image data record locally to the security domain at an image data record specific PHI share address in a PHI share memory unit local to the security domain, transmission of the pseudonymized image data record, the receiver node message and the PHI share address associated with the image data record to a cloud-based processing node.

The embodiments according to the invention that are described above for the method may also be in a form of a computer program product having a computer program, with the computer being prompted to carry out the method according to at least one embodiment of the invention that is described above when the computer program is executed on the computer or on a processor of the computer.

An alternative of at least one embodiment also includes a computer program having computer program code for carrying out all the method steps of at least one embodiment of the method that is claimed or that is described above when the computer program is executed on the computer. In this case, the computer program may also be stored on a machine-readable storage medium.

An alternative of at least one embodiment provides for a storage medium that is intended to store the computer-implemented method described above and can be read by a computer.

BRIEF DESCRIPTION OF THE DRAWINGS

The detailed description of the figures that follows discusses example embodiments—which are not intended to be understood to be restrictive—with the features and further advantages thereof with reference to the drawings, in which:

FIG. 2 shows a schematic illustration of a processing node according to an example embodiment of the invention.

FIG. 3 shows a schematic embodiment of a transmission node according to an example embodiment in the invention.

FIG. 4 shows a data flowchart for a method for collaboration between transmission and receiver nodes according to an example embodiment of the invention.

DETAILED DESCRIPTION OF THE EXAMPLE EMBODIMENTS

Figure 1:
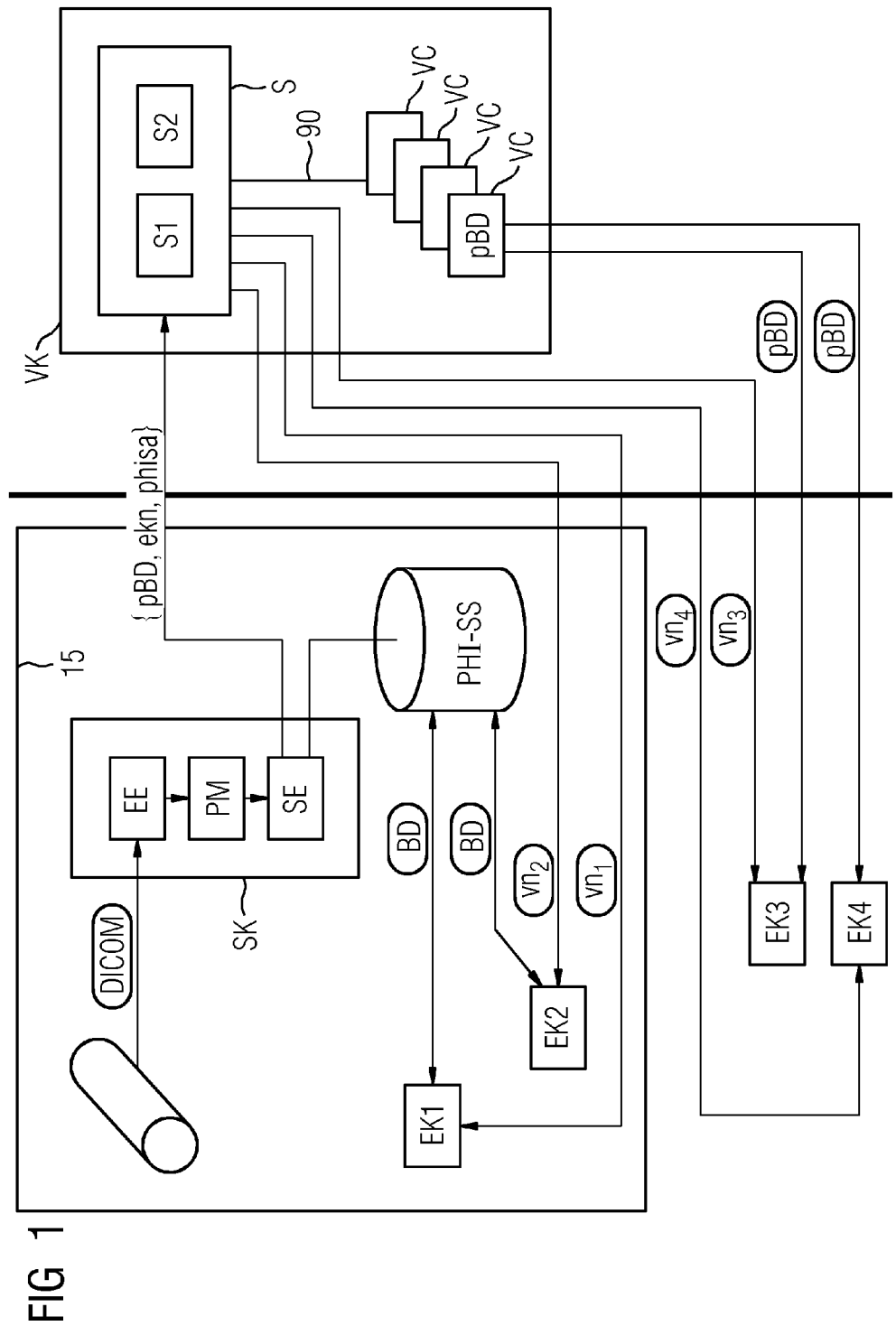
FIG. 1 shows a schematic and synoptic illustration of a network-based system according to an example embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to one aspect, at least one embodiment of the invention relates to a network-based system for the collaboration of transmission and receiver nodes for secure data interchange for radiological image data records having confidential components, comprising:

at least one transmission node, including:
        a reception unit that is intended to provide an image data record or to receive one from an imaging facility,
        a pseudonymization module that is intended to pseudonymize the image data record,
        a transmission unit that is intended to send the pseudonymized image data record and a receiver node message and a PHI share address to a processing node, wherein the receiver node message defines receiver nodes for the image data record that are determined by the transmission node and wherein the PHI share address is image data record specific and denotes a memory location in a PHI share memory unit local to the security domain at which the transmission unit stores the respective image data record,
    a cloud-based processing node, having:

an image data server that is intended to receive the pseudonymized image data record from the transmission node, a plurality of virtual clients, wherein a respective virtual client is associated with a respective receiver node and is intended to provide the pseudonymized image data record intended for the receiver node, a collaboration server that is intended to receive the receiver node message for the respective pseudonymized image data record from the transmission node and that is intended to send a connection message to the determined receiver nodes, wherein the connection message comprises a reference to an address for the respective virtual client in which the respective pseudonymized image data record for the receiver node is stored and/or the received PHI share address in the PHI share memory unit local to the security domain, at least one receiver node that can be determined by the transmission node for collaboration and on which the pseudonymized image data record is displayed by means of the reference to the virtual client associated with the receiver node if the receiver node is situated outside a security domain of the transmission node and on which the image data record is displayed by means of the address in the PHI share memory unit if the receiver node is situated inside the security domain of the transmission node.

Furthermore, according to one embodiment, the invention relates to a method for the collaboration of transmission and receiver nodes for secure data interchange for radiological image data records having confidential components, comprising the following method steps:

provision of an image data record on a transmission node, application of a pseudonymization function to the image data record in order to produce a pseudonymized image data record, determination of receiver nodes for the image data record and production of a receiver node message that defines the determined receiver nodes, storage of the image data record locally to the security domain at an image data record specific PHI share address in a PHI share memory unit local to the security domain, transmission of the pseudonymized image data record, the receiver node message and the PHI share address associated with the image data record to a cloud-based processing node, provision of a set of virtual clients, wherein a respective virtual client is associated with a respective receiver node and is intended to provide the virtual image data record that is intended for it, sending of a respective connection message from the cloud-based processing node to the respective receiver node, wherein the connection message comprises a reference to an address for the respective virtual client in which the respective pseudonymized image data record for the receiver node is stored and/or the received PHI share address in the PHI share memory unit local to the security domain, reception of the connection message on the at least one receiver node and activation of the reference contained therein for the provision of a pseudonymized image data record by means of the virtual client, if the receiver node is situated outside a security domain of the transmission node or for the provision of the image data record by means of the PHI share address in the PHI share memory unit local to the security domain if the receiver node is situated inside the security domain of the transmission node.

At least one embodiment is directed to a cloud-based processing node for the collaboration of transmission and receiver nodes for secure data interchange for radiological image data records having confidential components, including:

an image data server that is intended to receive the pseudonymized image data record from a transmission node, a plurality of virtual clients, wherein a respective virtual client is associated with a respective receiver node and is designed to provide the pseudonymized image data record intended for the respective receiver node, a collaboration server that is intended to receive a receiver node message and a PHI share address for the respective pseudonymized image data record from the transmission node and that is intended to send a connection message to the determined receiver nodes, wherein the connection message comprises a reference to an address for the respective virtual client in which the respective pseudonymized image data record for the receiver node is stored and/or the received PHI share address in a PHI share memory unit local to the security domain.

Furthermore, at least one embodiment is directed to a method for operating a cloud-based processing node for the collaboration of transmission and receiver nodes for secure data interchange for radiological image data records having confidential components, comprising:

reception of a pseudonymized image data record, a receiver node message and the PHI share address associated with the image data record, provision of a set of virtual clients, wherein a respective virtual client is associated with a respective receiver node and is intended to virtually provide the pseudonymized image data record that is intended for it, sending of a respective connection message to the respective receiver node, wherein the connection message comprises a reference to an address for the respective virtual client in which the respective pseudonymized image data record for the receiver node is stored and/or the received PHI share address.

At least one embodiment is directed to a transmission node for collaboration with the receiver nodes for secure data interchange for radiological image data records having confidential components, comprising:

a reception unit that is intended to provide an image data record or to receive one from an imaging facility, a pseudonymization module that is intended to pseudonymize the image data record, a receiver node determination unit that is intended to determine receiver nodes for the image data record and to generate a receiver node message therefrom, a transmission unit that is intended to send the pseudonymized image data record and an image data record specific PHI share address and the receiver node message to a processing node and wherein the transmission unit is intended to store the respective image data record at the PHI share address in a PHI share memory unit local to the security domain.

In addition, at least one embodiment of the invention may reside in a method for operating a transmission node for the collaboration of transmission and receiver nodes for secure data interchange for radiological image data records having confidential components, comprising:

provision of an image data record on a transmission node,
application of a pseudonymization function to the image data record in order to produce a pseudonymized image data record,
determination of receiver nodes for the image data record and production of a receiver node message that defines the determined receiver nodes,
storage of the image data record locally to the security domain at an image data record specific PHI share address in a PHI share memory unit local to the security domain,
transmission of the pseudonymized image data record, the receiver node message and the PHI share address associated with the image data record to a cloud-based processing node.

In this description, features, advantages or alternative embodiments that are mentioned are frequently described only in respect of the method for collaboration. However, it goes without saying that they can likewise be transferred to the other claimed subjects too, and vice versa. In other words, the substantive claims (that are directed at a system or at a node, for example) may also be developed with the features that are described or claimed in connection with the method. The corresponding functional features of the method are shaped by corresponding substantive modules, particularly by microprocessor or hardware modules.

The text below provides a brief definition of the concepts used in this application.

In at least one embodiment, the system is a network system, particularly a computer-based network system, comprising a multiplicity of transmission and receiver nodes. The transmission and receiver nodes may be workstations, a complex comprising a plurality of computers or else individual components in an extensive computer system. By way of example, it may thus be that a transmission or receiver node is an embedded processor in a computer system that may therefore be implemented in a medical installation, e.g. in an imaging modality or in another medical (e.g. laboratory) appliance. The transmission node usually interchanges data with an imaging facility (particularly with modalities of different type, comprising magnetic resonance imaging installations, ultrasound installations, computed tomography scanners, etc.).

Alternatively, it is possible for the transmission node to interchange data with an archive or with another storage node. The transmission node is used to provide image data records. This can be accomplished either by means of direct reception from a modality or by means of indirect reception of data records from another computer node. The transmission node is furthermore distinguished in that the user working at the respective transmission node wishes to share all or selected radiological image data records with other users. To this end, he can instigate a collaboration on the transmission nodes and initiate the relevant secure data interchange.

The "provision" of the image data record or of the pseudonymized image data record comprises the preparation of a display, and virtual display or presentation of the image data and applications that are connected to the representation of radiological image data on a user interface. According to one embodiment and advantageously, all computer processing, loading and computation processes that are necessary for providing the image data record or the pseudonymized image data record on the respectively determined receiver nodes are executed exclusively on the respective virtual client and not on the receiver node. No viewing software is installed, activated or executed on the receiver node that would otherwise, and according to the prior art, be required for displaying and providing the image data on a computer.

"Local to the security domain" means that the PHI share memory unit is firstly local and specific to the respective security domain and is secondly also central for a plurality of transmission and/or receiver nodes that are situated in the security domain of the transmission node. By way of example, a security domain may be the domain (local area network) of a hospital or of a department within a hospital or the domain of a clinic complex.

The data interchange relates to the provision of image data records. This can be carried out by way of medical viewing applications. These applications differ from standard applications in nonmedical areas and are distinguished by a very high volume of data in the region of several gigabytes per image data record and by increased demands on processing power. Furthermore, there are distributed applications that are executed both on a server and on the client.

"Pseudonymization" means rendering the confidential or security-critical components in the respective image data record unrecognizable. This can be accomplished by anonymizing or by erasing the security-critical data components, for example.

In the preferred embodiment, radiological image data records should be sent from the transmission node to one or more receiver nodes for the purpose of joint examination and/or editing. The image data record may be a unimodal or a multimodal image data record. Furthermore, it is possible for the image data record also to comprise further data records, for example metadata and a report, for example. The further data records may also be in a different data format than the image data record (e.g. in a text format). The image data record may therefore comprise X-ray images, computed tomography images, two-dimensional or multidimensional image data records, PET images and/or a combination of the image data records cited above.

Naturally, the modalities listed above are intended to be understood only as an example, and the image data record may also have been acquired from other appliances, such as medical laboratory appliances, for example. The image data record comprises confidential components. The term "components" is intended to be understood to mean a portion of a data record or a complete data record that represents security-critical or security-relevant data. These are also called PHI information (protected health information). The PHI information is permitted to be visible only inside a predefinable security domain. Usually, the security domain is defined in accordance with the boundaries of a medical facility (e.g. a hospital). The PHI information can be used to infer the identity of a patient.

According to an embodiment of the invention, it is possible to ensure that the confidential components of the image data records to be distributed do not automatically find their way outside a security domain of the sending node. To this end, a pseudonymization module is provided. The pseudonymization module is used for pseudonymizing the respective image data record. This can be accomplished using different methods. Primarily, a software-based pseudonymization module will be used. However, it is also possible to divert to alternative embodiments in this case. The term "pseudonymization" is meant to denote that all confidential data components are erased from the respective data record. This can be carried out by an anonymization function, for example, so that data components requiring secrecy are filtered out.

According to one aspect, it is possible for the pseudonymization to be carried out by erasing or anonymizing security-critical or confidential data components. In this case, it is also possible to use filter systems that specifically look for a particular data requiring secrecy, for example, such as patient name, date of birth, patient identification number, etc.

According to one aspect of at least one embodiment of the invention, it is possible for a preparation method to be able to be used to set the degree of pseudonymization. In this case, it is possible to determine which components of an image data record are defined as a confidential component and which can be sent safely beyond security domains.

The transmission node preferably comprises a reception unit, the pseudonymization module and a transmission unit. The three parts are preferably software- and/or hardware-based units. The pseudonymization module is distinguished in that the image data record in the original is used as an input variable and that a pseudonymized image data record is output as an output variable from the pseudonymization module. The image data record comprises all data as originally read in from the modality or a memory and therefore also comprises confidential data components. The pseudonymized data record is distinguished in that it comprises no further confidential data components. Usually, it is no longer possible for the original image data record to be calculated from the pseudonymized image data record.

The receiver node message is a digital message that defines the receiver nodes determined by the transmission node. This may—in the simplest case—be a list of receiver nodes (for example with the relevant IP addresses). Alternatively, it is possible for the receiver node message also to comprise further data records, for example time-based data records. By way of example, it may thus be specified when (instant or interval of time) the image data record or the pseudonymized image data record needs to be provided on the respective receiver nodes. Furthermore, the receiver node message can also be used to transfer further information about the transmission node and/or the receiver node.

The PHI share address is a memory address in a PHI share memory unit. The PHI share memory unit may be any data memory, comprising long-term archive, short-term archive, one-time programmable memory (programmable read-only memory, PROM), erasable memory (EPROM—erasable programmable read-only memory) or electrically erasable memory (electrically erasable programmable read-only memory, EEPROM). An essential aspect is that the PHI share memory unit is arranged locally in the respective security domain of the transmission node. The security domain can preferably be defined in a preparation phase. Usually, the respective network boundaries are used for defining the security domain. By way of example, in a system with very high security demands, the setting may be that the security domain is very small and relates exclusively to the transmission node. In this case, the transmission node itself would comprise the PHI share memory unit. If the security demands are meant to be handled less stringently, the security domain can be defined relatively extensively, so that besides the transmission node a number of receiver nodes can also be defined that are situated inside the security domain. Usually, the security domain is defined for all nodes that are situated inside a hospital, in order to be able to ensure data interchange that is as extensive as possible but nevertheless compliant with security rules. An advantage that arises with the present invention can be seen in that the security domain can be set independently of the application of the method and can also be altered during operation. Hence, the method can also be adapted to changes in respect of the security regulations.

The system comprises a processing node. The processing node is a computer-based node that can be accessed particularly via a public network connection. Usually, the processing node is cloud-based. Hence, the processing node is distinguished in that it is necessarily situated outside the security domain of the transmission node and can be accessed only via an Internet connection, for example. The processing node may be implemented particularly as a data center and comprises an image data server and a collaboration server and a multiplicity of virtual clients. The virtual clients are used to virtualize the respective receiver nodes. The respective virtual clients have a piece of imaging software installed on them that is intended to provide radiological image data records. A virtual client is therefore a front end of the respective application and runs in the cloud.

According to one aspect of at least one embodiment of the invention, the data center comprises not only the image data server, the collaboration server and the multiplicity of virtual clients but also further parts, such as an active directory, for example, in order to manage the respective user accounts, a virtualization infrastructure and a security infrastructure. The latter is intended to provide the infrastructure for the respective receiver nodes to be able to use a network connection to access the respective virtualized clients in the data center. The collaboration server can access a collaboration database that stores corresponding associations for IP addresses and receiver nodes, etc. Furthermore, the data center may also comprise a client software installation portal in order to comprise a viewer application and/or collaboration client (as a software application), which are then able to be installed on the respective nodes. As mentioned above, the processing node is implemented as a data center in the preferred embodiment.

The connection between the image data server and the virtualized clients is a network connection with high bandwidth and low latencies in order to be able to ensure efficient data interchange. An essential aspect is that there is no Internet connection between the image data server and the respective virtual clients. Usually, all units of the processing node that are cited above are arranged inside the same data center.

The receiver node is any computer-based node that has been determined by the transmission node for collaboration. An essential aspect is that the receiver node does not need to have the hardware (and software) that is otherwise necessary for providing the image data records or the pseudonymized image data records. Furthermore, it is also not necessary for a particular piece of software (e.g. viewing software) or even a particular version of a piece of viewing software to be installed on the receiver node. On the basis of the system according to at least one embodiment of the invention, the image data records or the pseudonymized image data records can be presented on the respective receiver nodes, totally independently of the respective infrastructural equipment of the receiver node. This allows radiological image data records in special or in standardized formats (e.g. DICOM) or in special conversions or compressions to be provided, by way of example, even on such receiver nodes as do not have the same software and/or hardware infrastructure as the transmission node.

According to at least one embodiment of the invention, the respective infrastructure is virtualized via the respective data center in the cloud. This is a particular advantage, since the collaboration can therefore be carried out very flexibly and independently of the respective computer equipment of the receiver nodes.

According to one aspect of at least one embodiment, the collaboration relates to applications in the field of medical radiology. These applications, particularly viewing applications, are distinguished by a high level of complexity, a high volume of data to be processed and high demands on the respective computation power of the computer or of the workstation. The installation complexity for these applications is therefore very high. In contrast to previous systems, the solution according to the invention therefore no longer requires particular installation procedures to be carried out on the receiver node in order to be able to examine the image data records in the first place. At this juncture, it should be pointed out that the term "collaboration" relates to computer-implemented operations and processes that are based on presentation of radiological image data. In other words, the display or presentation of radiological image data on a graphical user interface is indispensible for the collaboration. Further prerequisites for collaboration advantageously do not need to be fulfilled by the receiver nodes.

The embodiments according to the invention that are described above for the method may also be in a form of a computer program product having a computer program, with the computer being prompted to carry out the method according to at least one embodiment of the invention that is described above when the computer program is executed on the computer or on a processor of the computer.

An alternative of at least one embodiment also includes a computer program having computer program code for carrying out all the method steps of at least one embodiment of the method that is claimed or that is described above when the computer program is executed on the computer. In this case, the computer program may also be stored on a machine-readable storage medium.

An alternative of at least one embodiment provides for a storage medium that is intended to store the computer-implemented method described above and can be read by a computer.

It is within the scope of the invention for not all the steps of the method to necessarily to have to be executed on one and the same computer entity, but rather they can also be executed on different computer entities. The sequence of the method steps can also be varied if need be.

Furthermore, it is possible for individual sections of the method described above to be able to be executed in one salable unit and for the remainder of the components to be able to be executed in another salable unit—as a distributed system as it were.

The invention is explained in more detail below with reference to FIG. 1.

FIG. 1 shows, in a schematic form, a network-based system for the collaboration of computer-based transmission and receiver nodes SK, EK for secure data interchange for radiological image data records BD having confidential components.

The system or the method is designed to be fully automatic. As shown on the left-hand side in FIG. 1, the method is initiated from the transmission node SK. The transmission node SK is a computer-based entity that interchanges data either with a data archive or with different modalities (there may also be a plurality of modalities and archives). In FIG. 1, the schematic illustration of a magnetic resonance imaging installation is meant to be denoted by the image data record that is denoted by the reference symbol "DICOM" in FIG. 1. DICOM relates to an image standard in medical engineering (Digital Imaging and Communications System in Medicine). The vertical bar shown in FIG. 1 between the respective receiver nodes EK and the processing node VK is meant to denote a www connection and hence a nonsecure channel for data interchange. The processing node VK may be accessible via the http protocol.

As FIG. 3 shows, the transmission node comprises a reception unit EE, a pseudonymization module PM and a transmission unit SE. The reception unit EE is intended to provide the image data record BD received from the modality on the transmission node. In this case, "provide" relates to further processing steps for the image data. This may also comprise presentation of the image data record BD on the respective transmission node SK and the further editing steps that are executed by the pseudonymization module PM and by the transmission unit SE. The pseudonymization module PM is used for pseudonymizing the image data record BD in a pseudonymized image data record, which bears the reference symbol pBD in the figures. In the pseudonymized data record pBD, all confidential components are rendered unrecognizable or erased.

FIG. 2 synoptically shows the design of a processing node VK that is accessible via a public network (e.g. the Internet or another network with standardized data interchange, e.g. on the basis of the http protocol) and that may be implemented as a cloud-based data center and may comprise a plurality of computers and memories and databases. The processing node VK comprises an image data server S1, a multiplicity of virtual clients VC for a multiplicity of receiver nodes EK that they virtualize in each case, an active directory AD for managing the user accounts and a virtualization and security infrastructure in order to allow the data interchange between the respective receiver node EK and its counterpart in the cloud, the receiver node specific virtual client VC, in the first place. Furthermore, the processing node VK comprises a collaboration server, which may be able to interchange data with a collaboration database, and an installation portal 20 that keeps different software modules for download, such as e.g. a piece of software for an image viewer client 21 and a piece of software for a collaboration client 22.

The transmission unit SE is intended to send an image data record specific PHI share address phisa and a receiver node message ekn to a collaboration server S2. The pseudonymized image data record is sent to an image data server S1. Both servers S1, S2 are situated in a data center that is accessible via an Internet connection. For the sake of simplicity, FIG. 1 shows the sending of the data records from the transmission unit SE only in summary and directed at a server S. FIG. 3 shows the data interchange in more detail. The server S comprises the image data server S1 and the collaboration server S2. Preferably, the image data server S1 and the collaboration server S2 are isolated, separate units. However, it may be that individual functionalities of the respective servers are also combined; this is not absolutely necessary, however.

The transmission unit SE is used to send the pseudonymized image data record pBD to a processing node VK. In one embodiment, the processing node VK may be implemented as a cloud-based data center. In particular, the processing node VK may be able to use an Internet connection to interchange data with the transmission node SK and the receiver node EK. According to one preferred embodiment, the pseudonymized image data record pDB is sent from the transmission unit SE to an image data server S1 of the processing node VK. As mentioned above, the transmission unit SE is intended to send a receiver node message ekn to a collaboration server S2. The receiver node message ekn specifies the receiver nodes EK that have been determined by the transmission node SK in order to have the respective image data record BD displayed on the respective receiver nodes EK. In the simplest case, the receiver node message ekn contains a list of receiver nodes EK at which the respective radiological image data records in original and/or pseudonymized form are meant to be provided for the purpose of cooperation.

The image data server S1 is able to use an internal network connection 90 to interchange data with a plurality of virtual clients VC. In this case, a virtual client VC is a respective virtualization of the respective receiver node EK and is used to provide the respective image data in pseudonymized form. The internal network connection 90 is a secure data connection inside the data center.

After the server S of the processing node VK has received the pseudonymized image data records and also knows the receiver nodes EK to which the respective image data records are intended to be transmitted, the respective virtual client VC is initiated in the processing node VK. This may require the requisite software to be downloaded from an installation portal 20, which is preferably likewise provided inside the processing node VK. The portal 20 comprises a piece of software for a viewer 21 and a collaboration client 22, which may preferably also be in the form of a software module.

After all the necessary information for collaboration have thus been received in the data center, particularly the pseudonymized image data record pBD, the receiver node message ekn and the PHI share address phisa, the respective received pseudonymized image data record pBD can be forwarded to the respective virtualized client VC via the internal network connection 90.

Furthermore, the data center generates a connection message vn for the respective determined receiver nodes EK. Depending on how many receiver nodes EK have been specified by the transmission node SK, different connection messages vn1 are sent in this case. The respective connection message vn comprises a reference to the address of the respective virtual client VC in which the respective pseudonymized image data record pBD for the respective receiver node EK is stored or provided. Cumulatively or alternatively, the connection message comprises the PHI share address phisa received from the transmission node SK, which address is situated at a memory location in the PHI share memory unit PHI-SS local to the security domain. The PHI share memory unit PHI-SS is situated inside the same security domain 10 as the respective transmission node SK.

According to one form of an embodiment of the invention, the connection message vn comprises two links:
1. A link to the address of the virtual node VC in which the pseudonymized image data pBD for the respective receiver node EK are provided and
2. A link to the address in PHI share memory unit PHI-SS in which the original data image BD (that is to say with security-critical and confidential data components) are stored.

By way of example, the security domain 10 may be a hospital network. Hence, all transmission nodes SK and receiver nodes EK that are situated inside the hospital belong to the security domain 10. In the example shown in FIG. 1, this relates to the receiver nodes EK1 and EK2.

The receiver nodes EK3 and EK4 are situated outside the security domain 10 of the transmission node SK. The original image data BD must therefore never be presented on the receiver nodes EK3 and EK4.

According to one variant of an embodiment of the invention, there may additionally be a control module provided that is intended to generate the connection message vn on a receiver node specific basis. The control module is used to provide an automated method that provides exclusively only the image data in pseudonymized form, that is to say the pseudonymized image data pBD, on all receiver nodes EK that are situated outside the security domain 10. This becomes possible by virtue of the processing node VK generating the connection message specifically for the receiver node EK. Thus, the processing node VK will analyze that the receiver nodes EK3 and EK4 are situated outside the security domain 10, which means that the connection messages vn3 and vn4 each comprise only the link to the virtual clients VCEK3 and VCEK4. For the other receiver nodes EK1 and EK2, which are situated inside the security domain 10, the connection messages vn1 and vn2 each comprise only the link to the address phisa in the PHI share memory unit PHI-SS local to the security domain. The respective receiver nodes EK can then receive and process the connection message vn that is specific to them or resolve the link and access and present the image data BD, pBD.

Since the receiver nodes EK1 and EK2 are situated inside the security domain 10 of the transmission node SK, it becomes possible on these receiver nodes to open the link in the connection message VNEK intended for them, which link refers to the memory address in the local PHI share memory. Hence, the receiver nodes EK1 and EK2 can provide and read the original image data BD, while the receiver nodes EK3 and EK4 situated outside the security domain 10 are able to present only the pseudonymized image data pBD (via the link to the virtual client VC in the data center or processing node VK).

An essential aspect of an embodiment is that the image data in the original form never leave the security domain 10 of the transmission node SK. They remain in the original form inside the security domain 10 and are stored locally there, in a manner local to the security domain, in the PHI share memory unit PHI-SS. As soon as the security domain 10 is left, the image data are transferred only in pseudonymized form by means of the pseudonymized image data pBD. It is therefore possible to provide automated collaboration that complies with all security rules and that is independent of the infrastructural equipment of the receiver nodes EK.

Preferably, the collaboration is initiated by the transmission node SK. The transmission node SK defines the respective receiver nodes EK that it wishes to invite to collaborate. Advantageously, the user does not need to be concerned with whether the receiver nodes EK are situated inside or outside the security domain 10. The user of the transmission node SK is provided with an automated sequence. Said sequence is explained in more detail with reference to FIG. 4. After the system has started, the image data record BD is provided on the transmission node SK in S41.

In step S42, a pseudonymization function is applied to the image data record BD in order to produce the pseudonymized image data record pBD.

In step S43, receiver nodes EK for the respective image data record BD are determined and a receiver node message ekn that defines the currently determined receiver nodes EK is produced.

In step S44, the image data record BD is stored locally to the security domain at an image data record specific PHI share address phisa in the PHI share memory unit PHI-SS local to the security domain.

In step S45, the pseudonymized image data record BD and the receiver node message ekn and the PHI share address associated with the image data record BD are sent to the cloud-based processing node VK or to the data center.

In step S46, a set of virtual clients VC is provided. In this case, care should be taken to ensure that the respective provided clients VC are geared specifically to the respective receiver node EK and to the respective received pseudonymized image data pBD. A virtual client VD is associated with a respective receiver node EK, preferably in explicit fashion. The virtual client VC is used in each case to virtually provide the pseudonymized image data record pBD that is intended for it.

In step S47, the connection message vn is sent from the processing node VK to the respective receiver node EK that has been specified by means of the receiver node message ekn. Usually, a plurality of receiver nodes EK are involved. The connection message vn contains a reference to the address of the respective virtual client, as a result of which the latter can be called by the receiver node EK—preferably using a link. The connection message vn may comprise the received PHI share address in the PHI share memory unit local to the security domain.

In a preferred development of an embodiment of the invention, an additional control unit is provided in the processing nodes VK and is intended to analyze the receiver node EK. The control unit is used to determine whether the respective receiver node EK is situated inside or outside the security domain 10 of the transmission node SK. If the respective receiver node EK is situated inside the security domain 10, the connection message vn can be generated specifically and comprise only the received PHI share address phisa, as a result of which the original image data record BD with the security-critical data can then be automatically loaded on the respective receiver node EK from the local memory unit PHI-SS.

If the control unit assesses that the respective receiver node EK is situated outside the security domain 10 of the transmission node SK, it is necessary to ensure that only the pseudonymized image data pBD are then presented on the receiver node EK. In this case, the connection message vn then contains only the address of the respective virtual client VC. This means that the receiver node EK is able to access only the virtual client and hence only the pseudonymized image data pBD.

The last step S48 in FIG. 4 shows the reception of the connection message vn on the at least one receiver node EK and the activation of the reference or link contained therein for providing the pseudonymized image data record pBD by means of the virtual client VC (if the receiver node EK is situated outside the security domain 10 of the transmission node SK) or for providing the image data record BD by means of the PHI share address in the local PHI share memory unit PHI-SS if the receiver node EK is situated inside the security domain 10 of the transmission node SK.

The method then ends.

It is naturally possible for the transmission node SK to invite a plurality of receiver nodes EK in parallel to collaborate, some of which receiver nodes EK may be situated inside and some of which may be situated outside the security domain 10. Furthermore, the method can also be applied iteratively. Similarly, it is possible for further information and hence also further (additional) receiver nodes EK to arise during a collaboration that necessitate invitation of still further receiver nodes EK to collaborate. This becomes possible by virtue of the transmission node SK additionally defining further receiver nodes EK and the method being carried out repeatedly.

Figure 5:
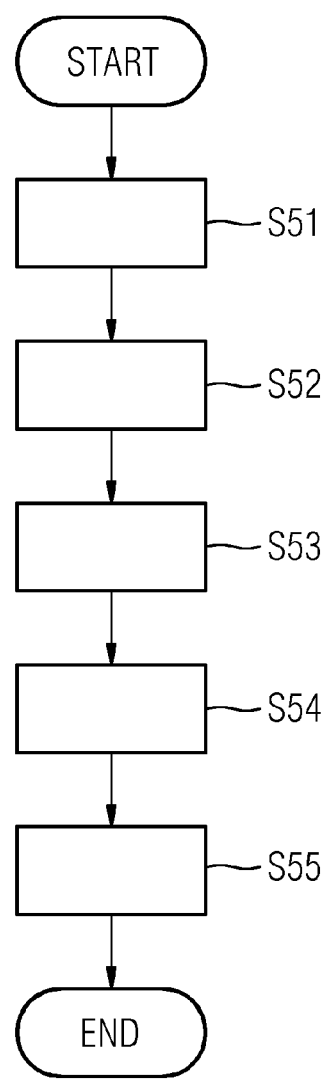
FIG. 5 shows a flowchart for a method for operating a transmission node according to an example embodiment of the invention.

The method for operating a transmission node SK for collaboration is explained in more detail below with reference to FIG. 5.

In a first step S51, the respective image data in the form of an image data record BD or in the form of a plurality of image data records BD are provided on the transmission nodes SK.

In step S52, the pseudonymization function is applied to the image data record BD in order to generate the pseudonymized image data record pBD.

In step S53, the respective receiver nodes EK for the respective image data record BD are determined and a receiver node message ekn that defines the previously determined receiver nodes EK is generated therefrom.

In step S54, storage of the image data record BD locally to the security domain is achieved, specifically at the image data record specific PHI share address in the PHI share memory unit PHI-SS.

In step S55, the pseudonymized image data record pBD, the receiver node message ekn and the PHI share address phisa associated with the image data record BD are sent to the processing node VK.

The method then ends.

Figure 6:
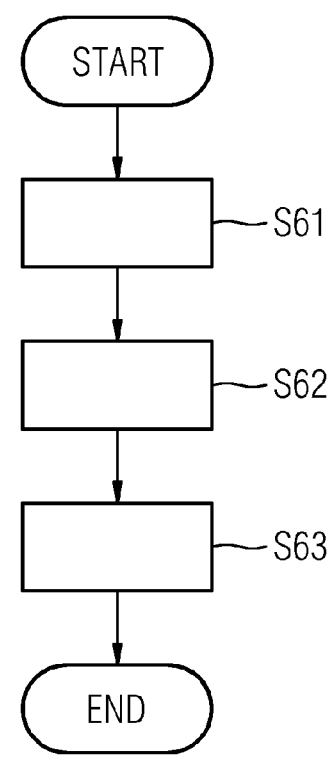
FIG. 6 shows a schematic illustration of a sequence for a method for operating a cloud-based processing node according to an example embodiment of the invention.

The method for operating the cloud-based processing node VK for collaboration is explained in more detail with reference to FIG. 6.

In step S61, the respective pseudonymized image data record pBD, the receiver node message ekn and the PHI share address phisa associated with the image data record are received on the processing node VK.

In step S62, a set of virtual clients VC is instantiated, a respective virtual client VC being specifically associated with a respective receiver node EK and being intended to virtually provide the pseudonymized image data record pBD that is intended for it. The virtual client VC has the requisite software and hardware infrastructure, which can be downloaded inside the processing node VK from the portal 20.

In step S63, a connection message vn is sent to the respective receiver nodes EK. Usually, the connection message vn is broadcast to a multiplicity of receiver nodes EK, wherein the connection message vn comprises a reference to the address of the virtual client VC in the processing node VK and/or a reference to the memory location in the PHI share memory unit PHI-SS.

Finally, it should be pointed out that the description of the invention and the example embodiments are in principle not intended to be understood as restrictive to a particular physical implementation of the invention. In particular, it is obvious to a person skilled in the art that the invention can be implemented partially or completely in software and/or hardware and/or in a manner distributed over a plurality of physical products—in this case particularly also computer program products.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A network-based system for collaborating transmission and receiver nodes for secure data interchange for radiological image data records including confidential components, the network-based system comprising:

at least one transmission node, including a memory and a processor, the memory of the at least one transmission node containing instructions that, when executed by the processor of the at least one transmission node, configure the processor of the at least one transmission node to,
exchange an image data record with an imaging facility,
determine a degree of pseudonymizing such that different components of the image data record are pseudonymized based on the degree of pseudonymizing,
produce a pseudonymized image data record from the image data record based on the degree of pseudonymizing,
send the pseudonymized image data record, a receiver node message and a protected health information (PHI) share address to a processing node, the receiver node message defining receiver nodes for the image data record that are determined by the transmission node, the PHI share address being image data record specific and denoting a memory location in a PHI share memory local to a security domain at which the respective image data record is stored;

a cloud-based processing node including a memory and a processor, the memory of the cloud-based processing node containing instructions that, when executed by the processor of the cloud-based processing node, configure the processor of the cloud-based processing node to,
receive the pseudonymized image data record from the transmission node,
generate a plurality of virtual clients virtualizing respective receiver nodes such that (i) no internet connection exists between an image data server and the plurality of virtual clients, (ii) a respective one of the virtual clients is associated with the respective receiver node to provide the pseudonymized image data record intended for the respective receiver node, (iii) the plurality of virtual clients each have a collaboration client installed thereon that is compatible with the respective receiver node and accessible by the respective receiver node via a client software installation portal without a viewer application installed on the respective receiver node to view the pseudonymized image data, and
receive the receiver node message for the pseudonymized image data record from the transmission node,
determine which one of a first connection message and a second connection message to send to the respective receiver node as a transmittable connection message based on whether the respective receiver node is situated inside or outside a security domain of the transmission node, the first connection message containing an address of a virtual client having the PHI share address and the second connection message containing an address to a virtual client having the pseudonymized image data record, and
send the transmittable connection message to the respective receiver node; and
at least one receiver node, determined by the transmission node for collaboration, the receiver node including a memory and a processor, the memory of the receiver node containing instructions that, when executed by the processor of the receiver node, configure the processor of the receiver node to,
display the pseudonymized image data record via a reference to the virtual client associated with the receiver node, if the receiver node is situated outside a security domain of the transmission node such that a user associated with the receiver node uses the client software installation portal to collaborate with other users within the security domain to perform a diagnosis on a patient associated with the image data record without the user associated with the receiver node having an indication of protected health information associated with the patient, and
display the image data record via the address in the PHI share memory, if the receiver node is situated inside the security domain of the transmission node.

2. A method for collaborating transmission and receiver nodes for secure data interchange for radiological image data records including confidential components, the method comprising:
provisioning an image data record on a transmission node;
determining a degree of pseudonymizing such that different components of the image data record are pseudonymized based on the degree of pseudonymizing;
applying a pseudonymization function to the image data record to produce a pseudonymized image data record based on the degree of pseudonymizing;
determining receiver nodes for the image data record and producing a receiver node message that defines the determined receiver nodes;
storing the image data record locally to a security domain at an image data record specific protected health information (PHI) share address in a PHI share memory local to the security domain;
transmitting the pseudonymized image data record, the receiver node message and the PHI share address associated with the image data record to a cloud-based processing node;
provisioning a set of virtual clients that virtualize respective receiver nodes such that (i) no Internet connection exists between an image data server and the set of virtual clients, (ii), a respective one of the set of virtual clients is associated with the respective receiver node to virtually provide the pseudonymized image data intended for the respective receiver node, (iii) the set of virtual clients each have a collaboration client installed thereon that is compatible with the respective receiver node and accessible by the respective receiver node via a client software installation portal without a viewer application installed on the respective receiver node to view the pseudonymized image data;
determining which one of a first connection message and a second connection message to send to the respective receiver node as a transmittable connection message based on whether the respective receiver node is situated inside or outside a security domain of the transmission node, the first connection message containing an address of a virtual client having the PHI share address and the second connection message containing an address to a virtual client having the respective pseudonymized image data record
sending the transmittable connection message from the cloud-based processing node to the respective receiver node;
receiving the transmittable connection message on the respective receiver node; and
activating a reference contained in the transmittable connection message for the provision of the pseudonymized image data record by way of the virtual client, if the receiver node is situated outside a security domain of the transmission node such that a user associated with the receiver node uses the client software installation portal to collaborate with other users within the security domain to perform a diagnosis on a patient associated with the image data record without the user associated with the receiver node having an indication of protected health information associated with the patient or
activating the reference contained in the transmittable connection message for the provision of the image data record by way of the PHI share address in the PHI share memory local to the security domain, if the receiver node is situated inside the security domain of the transmission node.

3. The method of claim 2, wherein the provisioning of the image data record or of the pseudonymized image data record for all receiver nodes is effected consistently and independently of an application installed on the receiver node.

4. The method of claim 2, wherein the confidential components of the radiological image data record are available for collaborating only inside the security domain of the transmission node.

5. The method of claim 2, wherein the confidential components of the radiological image data record are at least one of,
automatically not displayed if the respective receiver node is outside the security domain of the transmission node, and
automatically not transmitted beyond a boundary of the security domain of the transmission node.

6. The method of claim 2, wherein the image data record is unimodal or multimodal and is acquired on different imaging medical facilities.

7. The method of claim 2, wherein the provisioning of the image data record or of the pseudonymized image data record on the respective determined receiver nodes is prompted exclusively by the transmission node.

8. The method of claim 2, wherein computer processing with loading and computation processes for providing the image data record or the pseudonymized image data record on the respective determined receiver nodes is executed exclusively on the respective virtual client and not on the receiver node.

9. A transmission node for collaboration with receiver nodes for secure data interchange for radiological image data records including confidential components, comprising:
a memory and processor, the memory including instructions that, when executed by the processor, configure the processor to,
exchange an image data record with an imaging facility,
determine a degree of pseudonymizing such that different components of the image data record are pseudonymized based on the degree of pseudonymizing, pseudonymize the image data record and to produce a pseudonymized image data record based on the degree of pseudonymizing,
determine receiver nodes for the image data record and to generate a receiver node message therefrom,
send the pseudonymized image data record, an image data record specific protected health information (PHI) share address and the receiver node message to a cloud-based processing node, the cloud-based processing node configured to determine which one of a first connection message and a second connection message to send to the respective receiver node as a transmittable connection message based on whether the respective receiver node is situated inside or outside a security domain of the transmission node, the first connection message containing an address of a virtual client having the PHI share address and the second connection message containing an address to a virtual client having the respective pseudonymized image data record, the virtual client being one of a plurality of virtual clients virtualizing respective receiver nodes such that (i) no internet connection exists between an image data server and the plurality of virtual clients, (ii) a respective one of the virtual clients is associated with the respective receiver node to provide the pseudonymized image data record intended for the respective receiver node, (iii) the plurality of virtual clients each have a collaboration client installed thereon that is compatible with the respective receiver node and accessible by the respective receiver node via a client software installation portal without a viewer application installed on the respective receiver node to view the pseudonymized image data, and
store the respective image data record at the PHI share address in a PHI share memory local to the security domain.

10. A method for operating a transmission node for collaborating transmission and receiver nodes for secure data interchange for radiological image data records including confidential components, the method comprising:
provisioning an image data record on a transmission node;
determining a degree of pseudonymizing such that different components of the image data record are pseudonymized based on the degree of pseudonymizing;
applying a pseudonymization function to the image data record to produce a pseudonymized image data record based on the degree of pseudonymizing;
determining receiver nodes for the image data record and producing a receiver node message that defines the determined receiver nodes;
storing the image data record locally to a security domain at an image data record specific protected health information (PHI) share address in a PHI share memory local to the security domain; and
transmitting the pseudonymized image data record, the receiver node message and the PHI share address associated with the image data record to a cloud-based processing node, the cloud-based processing node configured to determine which one of a first connection message and a second connection message to send to the respective receiver node as a transmittable connection message based on whether the respective receiver node is situated inside or outside a security domain of the transmission node, the first connection message containing an address of one of the plurality of virtual clients having the PHI share address and the second connection message containing an address to one of the plurality of virtual clients having the respective pseudonymized image data record, the virtual client being one of a plurality of virtual clients virtualizing respective receiver nodes such that (i) no internet connection exists between an image data server and the plurality of virtual clients, (ii) a respective one of the virtual clients is associated with the respective receiver node to provide the pseudonymized image data record intended for the respective receiver node, (iii) the plurality of virtual clients each have a collaboration client installed thereon that is compatible with the respective receiver node and accessible by the respective receiver node via a client software installation portal without a viewer application installed on the respective receiver node to view the pseudonymized image data.

11. A cloud-based processing node for collaborating transmission and receiver nodes for secure data interchange for radiological image data records including confidential components, the cloud-based processing node comprising:
a memory and processor, the memory including instructions that, when executed by the processor, configure the processor to,
receive a pseudonymized image data record from a transmission node,
generate a plurality of virtual clients virtualizing respective receiver nodes such that (i) no internet connection exists between an image data server and the plurality of virtual clients, (ii) a respective one of the virtual clients is associated with a respective receiver node to provide the pseudonymized image data record intended for the respective receiver node, (iii) the plurality of virtual clients each have a collaboration client installed thereon that is compatible with the respective receiver node and accessible by the respective receiver node via a client software installation portal without a viewer application installed on the respective receiver node to view the pseudonymized image data,
receive a receiver node message and a protected health information (PHI) share address for the pseudonymized image data record from the transmission node,
determine which one of a first connection message and a second connection message to send to the respective receiver node as a transmittable connection message based on whether the respective receiver node is situated inside or outside a security domain of the transmission node, the first connection message containing an address of one of the plurality of virtual clients having the PHI share address and the second connection message containing an address to one of the plurality of virtual clients having the pseudonymized image data record, and
send the transmittable connection message to the respective receiver node.

12. A method for operating a cloud-based processing node for collaborating transmission nodes and receiver nodes for secure data interchange for radiological image data records including confidential components, the method comprising:
receiving a pseudonymized image data record, a receiver node message and a protected health information (PHI) share address associated with the radiological image data record;
provisioning a set of virtual clients virtualizing respective receiver nodes such that (i) no internet connection exists between an image data server and the plurality of virtual clients, (ii) a respective one of the set of virtual clients being associated with a respective receiver node to virtually provide the pseudonymized image data record intended for each respective virtual client, (iii) the plurality of virtual clients each have a collaboration client installed thereon that is compatible with the respective receiver node and accessible by the respective receiver node via a client software installation portal without a viewer application installed on the respective receiver node to view the pseudonymized image data;

determining which one of a first connection message and a second connection message to send to the respective receiver node as a transmittable connection message based on whether the respective receiver node is situated inside or outside a security domain of the transmission node, the first connection message containing an address of one of the plurality of virtual clients having the PHI share address and the second connection message containing an address to one of the plurality of virtual clients having the pseudonymized image data record; and sending connection message to the respective receiver node.

13. The network-based system of claim 1, wherein the confidential components of the radiological image data record are available for the collaboration only inside the security domain of the transmission node.

14. The network-based system of claim 1, wherein the confidential components of the radiological image data record are at least one of,
  automatically not displayed if the respective receiver node is outside the security domain of the transmission node, and
  automatically not transmitted beyond a boundary of the security domain of the transmission node.

15. The network-based system of claim 1, wherein the image data record is unimodal or multimodal and is acquired on different imaging medical facilities.

16. The method of claim 10, wherein the confidential components of the radiological image data record are available for collaborating only inside the security domain of the transmission node.

17. The method of claim 10, wherein the confidential components of the radiological image data record are at least one of,
  automatically not displayed if the respective receiver node is outside the security domain of the transmission node, and
  automatically not transmitted beyond a boundary of the security domain of the transmission node.

18. The method of claim 10, wherein the image data record is unimodal or multimodal and is acquired on different imaging medical facilities.

19. The method of claim 12, wherein the confidential components of the radiological image data record are available for collaborating only inside the security domain of the transmission node.

20. The method of claim 12, wherein the confidential components of the radiological image data record are at least one of,
  automatically not displayed if the respective receiver node is outside the security domain of the transmission node, and
  automatically not transmitted beyond a boundary of the security domain of the transmission node.

21. The method of claim 12, wherein the radiological image data record is unimodal or multimodal and is acquired on different imaging medical facilities.

* * * * *